(12) United States Patent
Bomba

(10) Patent No.: US 11,654,473 B2
(45) Date of Patent: May 23, 2023

(54) SYSTEM AND METHOD OF HANDLING SLENDER BODIES IN A MACHINING AND VERIFICATION PLANT

(71) Applicant: RDE COMPANY S.R.L., Milan (IT)

(72) Inventor: Gabriele Bomba, Milan (IT)

(73) Assignee: RDE COMPANY S.R.L., Milan (IT)

(*) Notice: Subject to any disclaimer, the term of this patent is extended or adjusted under 35 U.S.C. 154(b) by 754 days.

(21) Appl. No.: 16/627,049

(22) PCT Filed: Jun. 29, 2018

(86) PCT No.: PCT/IB2018/054849
§ 371 (c)(1),
(2) Date: Dec. 27, 2019

(87) PCT Pub. No.: WO2019/003196
PCT Pub. Date: Jan. 3, 2019

(65) Prior Publication Data
US 2020/0122221 A1 Apr. 23, 2020

(30) Foreign Application Priority Data
Jun. 29, 2017 (IT) .......................... 102017000073093

(51) Int. Cl.
*B21F 1/02* (2006.01)
*B21F 23/00* (2006.01)
(Continued)

(52) U.S. Cl.
CPC .............. *B21F 1/026* (2013.01); *B21F 11/00* (2013.01); *B21F 23/005* (2013.01); *B23Q 7/035* (2013.01);
(Continued)

(58) Field of Classification Search
CPC ........ B21D 43/006; B21F 1/026; B21F 11/00; B21F 23/005; B65G 17/002; B65G 17/46;
(Continued)

(56) References Cited

U.S. PATENT DOCUMENTS

| | | |
|---|---|---|
| 2019/0120615 A1 | 4/2019 | Bomba |
| 2019/0120616 A1 | 4/2019 | Bomba |

FOREIGN PATENT DOCUMENTS

| | | | |
|---|---|---|---|
| EP | 0669859 A1 | 9/1995 | |
| EP | 1110642 A2 * | 6/2001 | ............ B21F 23/005 |

(Continued)

OTHER PUBLICATIONS

International Search Report and Written Opinion, dated Sep. 28, 2018, from corresponding PCT application No. PCT/IB2018/054849.

*Primary Examiner* — Tyrone V Hall, Jr.
(74) *Attorney, Agent, or Firm* — Nixon & Vanderhye

(57) ABSTRACT

A method and a system for handling slender bodies in a semi-finished production plant includes a cutting station separating slender bodies from a continuous wire, a finishing station of the head ends of the slender bodies, a dimensional verification station downstream of the finishing station, and transporting equipment transporting the slender bodies between stations. At or upstream of the cutting station a marking unit applies a reference marking on the slender bodies, which working identifies an original attitude including angular position. The transporting equipment includes gripping and locking assembly, locking at least the angular position of the reference mark to a relative reference system of the transport equipment. Upstream of the finishing station is a detecting and storing unit for data of the angular position to the relative reference system. A unit determines the (Continued)

original attitude of the slender bodies using the data in the dimensional verification station.

20 Claims, 5 Drawing Sheets

(51) Int. Cl.
    *B23Q 7/04*         (2006.01)
    *B23Q 15/00*      (2006.01)
    *B23Q 7/03*         (2006.01)
    *B21F 11/00*      (2006.01)
    *B65G 47/86*      (2006.01)
    *B65G 47/36*      (2006.01)

(52) U.S. Cl.
    CPC ............. *B23Q 7/043* (2013.01); *B23Q 7/047* (2013.01); *B23Q 7/048* (2013.01); *B23Q 15/00* (2013.01); *B65G 47/36* (2013.01); *B65G 47/842* (2013.01)

(58) Field of Classification Search
    CPC ........ B65G 47/843; B65G 47/36; B23Q 7/04; B23Q 7/048; B23Q 7/047; B23Q 7/043; B23Q 7/03; B23Q 7/035
    See application file for complete search history.

(56) References Cited

FOREIGN PATENT DOCUMENTS

| | | | | |
|---|---|---|---|---|
| WO | WO-9506531 A1 | * | 3/1995 | ........... B21D 43/006 |
| WO | WO-2010139374 A1 | * | 12/2010 | ............ B21F 23/005 |
| WO | 2017168324 A1 | | 10/2017 | |
| WO | 2017168326 A1 | | 10/2017 | |

* cited by examiner

SYSTEM AND METHOD OF HANDLING SLENDER BODIES IN A MACHINING AND VERIFICATION PLANT

FIELD OF THE INVENTION

The present invention concerns a system for handling slender bodies in a processing and verification plant, in particular a system which allows to increase the processing accuracy in the machining plants of such slender bodies.

TECHNOLOGICAL FIELD OF THE INVENTION

The present invention falls within the scope of production of slender artifacts field. In the context of the present application, the term artifact or slender body means a product in which one dimension (length) is very predominant on the other two dimensions (width, height), and is also significant in absolute terms so that technological difficulties arise to obtain a machining accuracy on this preponderant dimension.

Typical slender bodies are rods or wires.

These products are typically produced from metallic, polymeric or non-metallic materials, by extrusion and/or hot and/or cold drawing, depending on the nature of the material they are made of and the technical characteristics to be obtained.

The features required by the buyers and therefore sought by the producers of these semi-finished products, as well as the nature of the material, are mainly linked to the geometric aspects. Thus, special care must be taken in defining the cross section (shape and size), the length, the surface finish and the geometries of the ends of the artifact. All these features must be realized in the production process and the required quality levels need specific precautions and attentions; in particular, this innovation is addressed to the problems related to improving the straightness of the product and the refinement of the machining of the end portions.

When starting from a raw material in rod or extruded wire (with circumscribed circumferential diameters from 2 to 60 mm), the production process involves starting from a continuous wire, or very long with respect to the length of the final wire, with a slightly larger section then the final one; the wire is often wrapped in a coil, with a section of measure and shape close to the final one. This continuous wire, in order to be transformed into discrete rods, first is normally pre-straightened—in case of the product is in coil, to obtain a wire as straight as possible—then drawn, to obtain a very precise and well-defined section, then cut into pieces slightly longer than the final length, then straightened to obtain a product as straight as possible and finally the ends are machined to bring it to the desired size and determine the desired geometry end.

In the production sector of such slender artifacts, increasing quality levels are required, as they are necessary to meet the growing demands of the transformation processes of these semi-finished products. For example, perfect straightness fosters higher rotational speeds in turning process; the precision of the finishing of the ends fosters the entry and/or the saving of time in the subsequent processing steps.

The need to guarantee always increasing quality levels makes it necessary to introduce specific quality control technologies, such as the final straightness and the precision of the end geometry. These controls are normally useful to be carried out on the discrete finished rod before final packaging. The controls have, besides the function of intercepting the overcoming of specific quality limits required by the standards and/or by the customers, they also have to provide useful information to adjust the upstream processes in order to improve the performances, efficiency and productive effectiveness. In particular, the controls concern both geometric aspects, such as the verification of straightness, and technological aspects, that is the control of the machining operations performed (on the surface and on the ends of the slender product).

The technique increasingly sees the spread of new technologies for the control of straightness, which in the most advanced cases makes it possible to reconstruct the true shape of the artifact by eliminating the deformation effects caused by gravity and frictions. In this regard, refer to what is described in the applications WO2017/168324 and WO2017/168326 on behalf of the same Applicant.

During the working process, the material is transformed from a continuous wire, possibly wrapped in coil, to rods of defined length. To achieve this, it is necessary to cut the wire and complete the machining operations on the individual elements. This aspect, which is necessary, implies the loss of the information of the rotational orientation and of the longitudinal position of the rod inside the continuous wire, information which is therefore no longer available in the final step of quality measurements. This means an important loss of information, since if it is not known how to adjust the measurements with respect to the machining process that has undergone the material, there are technical limits in the accuracy determination of the correction and coordination values to be fedback on the production parameters upstream the controls.

For better understanding of the invention, it is necessary to specifically examine the sequence of the operations of the machining process.

From a long straight or coil wire with an approximate section, first it is obtained a pre-straightened and drawn product, then it is cut and straightened, then the ends are machined. After cutting, as expected, the product rotates freely both in the straightening step and in the rotational rolling process in the case of products with a round section. After straightening, the rod enters machines known as chamfering machines, where a finishing operation is performed consisting in a flattening of the end face and the creation of a bevel, that is a rounding with a sloped cut of a defined geometry along the perimeter edge of the head section. These machines normally have two functional aspects: the movement of the rod and the machining of the end(s).

The movement is normally carried out by translation of the rods suitably arranged in parallel, so as to present the head of the artifacts to a machining station in sequence. Typically, the rods advanced simply placed on carpets with dowels shaped with a step movement until, having reached the tooling machining station, they are temporarily locked in position and machined.

FIG. 3, which is a schematic perspective view, shows an example of a prior art transport system. Note that the presence of pairs of supports A, on which the rods are placed, which allow the translation of the rods parallel to each other. The supports are typically fixed to a pair of chains or transmission belts C provided with synchronized movement. In this figure, the machining and/or geometrical detection planes P can be seen.

Another system of rods movement of prior art is illustrated by examples in EP 669.859 in which rod clamping means are disclosed.

During this movement, as expected, there is the problem that the information about the original position of the bar and its rotational phase in the original raw material (the coil) and during previous machining operations is lost, information which otherwise would be useful to be available when measuring straightness.

SUMMARY OF THE INVENTION

An object of the invention is therefore to solve the problems highlighted by providing an apparatus and related operative method which allows to keep more information on the machined artifact at least until the dimensional verification step, in order to also have useful elements for defining corrective parameters to be reused during production step.

This object is achieved by means of an apparatus and a method as disclosed in essential terms in the attached claims.

In particular, according to a first aspect, it is envisaged to apply on a rod a reference or a marking upon shearing (that is, in the step in which the rod is separated from the wire coil), or in an immediately subsequent step, checking in any case that the rod separated from the wire, has not yet undergone significant rotations with respect to the purposes of the final re-phasing.

The marking technique is not relevant as such and may include punching, mechanical or laser engraving, application of paints or optical references of various kinds; the important thing is that these references are not deteriorated or cancelled in the subsequent machining steps until at least the entry into the bevelling machine.

A preferred solution is to realize a small incision on the surface of the base end of the slender artifact, by means of a special cutting tool used as miter saw, so that this performs the double function of cutting and marking: in this way the marking—and the consequent phase information of the rod—is applied in an area that is removed in the final semi-finished product and remains also protected during the rolling and possibly surface finishing steps.

According to another aspect of the invention, the semi-finished product consisting of the rod, once marked, reaches the bevelling machine by means of a conveying system which prevents rotation and translation along its longitudinal axis during transfer and machining in the machine. This system is essential and must have specific features with respect to what is proposed in the prior art.

Traditionally, the rod movement within the machining process is carried out by means of translation on systems made with cradle supports clasped to chains or belts, without the position between the bar and the transport cradle being established in any way, as also occurs in EP 669.859.

The equipment according to the invention requires a peculiar expedient for moving the rods, keeping some references fixed since when the rods are separated from the wire to the final bevelling process is performed; it consists of a system of continuously moving clamps, made integral in movement with the chain for the translation along the motion direction of the rods and perfectly synchronized or phased with respect to the cradles on which the rods rest; the movable clamp or gripper is designed to be closed in order to prevent rotation and longitudinal translation of the rod and is designed in order to move within a channel of suitable precision so that the rod position during translations between the various machining and/or measurement stations does not vary and guarantees the required accuracy; if necessary, this guiding channel can be made integral with the support frames of the measurement and machining systems in order to guarantee that this precision is kept over time.

The clamps or blocking systems can be opened and closed by a fixed ground reference system with various types of systems: by engagement with cam systems during translation or by fixed or mobile localized actuators able to intervene in specific points of the path for the opening and closing of the clamp or with mixed systems provided with fixed cams interspersed with mobile cam portions to manage the opening of the clamp when the translation chain is stationary.

Advantageously, with such a locking system interacting with the translation chain, it is possible to achieve the locking of the rods with respect to the translating relative reference system as soon as they are taken by the transport equipment. The transport equipment thus guarantees that the rod does not rotate and does not move longitudinally on its axis, so that the working previously made upon wire cutting can be detected and stored; in other words, after cutting in the desired position, the rod is transported in a locked position with respect to a predefined reference system.

In this way, in subsequent stations which may also involve the elimination of the previously created working, both the phase and the longitudinal position of the rod or the semi-finished product do not change, thus overcoming the limits of the prior art and originally solving the identified problem, improving the machining technique of the ends and the relative measurements, thus also allowing to have a useful information for re-phasing the geometries detected by the straightness control systems with respect to the position of the material in the initial wire.

The rod locking on the transport equipment, after the cutting, also allows to keep a stable reference plane, which produces useful effects even only on the quality of the final bevelling process.

In short, the application of a reference mark at the ends of the rod at the time of separation from the continuous wire, together with the provision of rotation and translation locking means acting at least before the entry of the rod into the end machining machine (e.g. a chamfering machine), allows to obtain more precise machining and to carry out the appropriate dimensional measurements: as a matter of fact, according to the invention, it is possible to deliver the rod to the straightness control systems together with the original orientation information, in order to be able to phase the data and the measurements with respect to the position of the material in the initial wire. The application of the phase mark before the relative elimination for production needs does not affect these purposes, due to the prevention of the rotation of the product until the detection of straightness.

The advantage of not having longitudinal movements of the rods on the supports of the transport equipment, during the step translation between the machining stations, also allows to achieve greater precision in the machining operations, since there are no longer longitudinal movements of the rod between the various processing stations.

BRIEF DESCRIPTION OF THE DRAWINGS

Further features and advantages of the invention will anyway be more evident from the following detailed description of some preferred embodiments, given by mere way of non-limiting example and illustrated in the attached drawings, wherein.

DETAILED DESCRIPTION OF PREFERRED EMBODIMENTS

Figure 1:
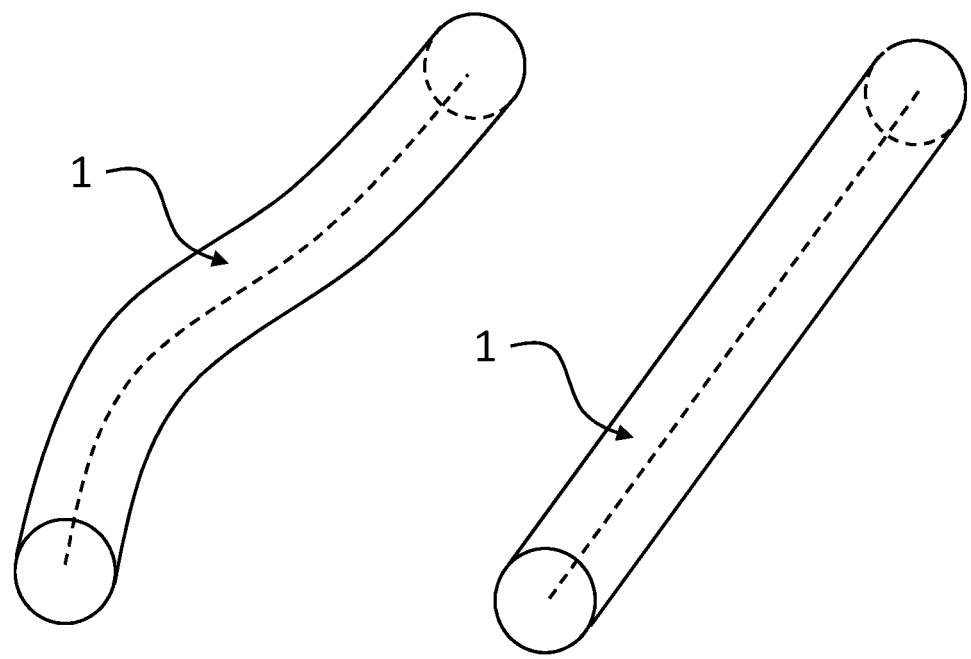
FIG. 1 is a schematic view of two exemplary slender rod portions.

In FIG. 1, two exemplary slender rods with circular section 1, one straight and one with straightness defects are generically illustrated; the present disclosure refers generally to slender bodies or rods and is not limited to rods with a round section but to practically all the typical typologies of such artifacts: hexagonal, square, rectangular and so on. The rods can be obtained from metallic material wires, but also from different materials.

Figure 2:
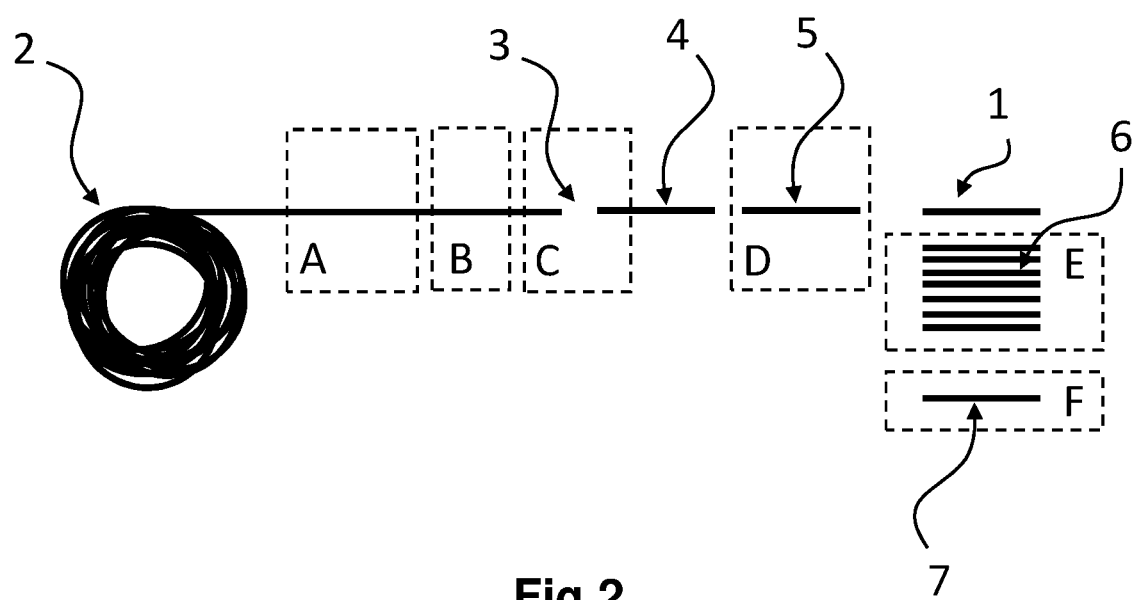
FIG. 2 is a layout view illustrating the possible sequence of machining operations in a production plant for semi-finished products in rods.

FIG. 2 shows a generic production scheme, wherein the transformation of a continuous wire wrapped in coil 2 occurs, according to different machining steps that we generally identify as steps A, B, C, D, E, F. Step A represents a pre-straightening of the wire, step B represents a drawing, step C is a cross cut or cut wherein the wire is interrupted in the cutting station 3 in order to obtain portioned rods 1, 4, 5, 6 and 7 of desired length.

At the same time or immediately before this cutting step, a reference mark is applied to the free end of the rod, preferably by means of the same cutting tool. The mark is applied on a portion that is eliminated afterwards in the last machining step in the production of the semi-finished product, because it may not be appreciated to leave such mark (which would be a superficial defect) in the product that is offered for sale.

From the cutting step in station 3, the portioned rod can rotate randomly, as the original orientation information of the material with respect to the angular position in the coil is fixed by the reference mark: this information is essential for re-phasing the straightness measurements with respect to the starting product. To this purpose, preferably, the relative position of the continuous wire in coil with respect to the tool which applies the marks, is recorded with an appropriate storage device.

FIG. 2 shows the following rolling step D, the bevelling step E and the straightness or other qualitative aspects of the finished product measurement step 7, prior to packaging and storage.

In step E, after blocking the rods 6 with respect to a new reference system, preventing rotations and longitudinal displacements on the transport system of the rods 6, the phase position of the rod is stored using the reference mark applied in the cutting station 3, thus being able to freely machine the ends, in order to bring the phase angle for the mathematical re-phasing tasks back to the final measurement system.

Therefore, in step E, hence in the last machining station where the end parts of the rod are removed (where the reference marks are provided)—for example by simple bevelling—the attitude (at least the angular phase) of that specific rod is detected and stored upon its locking on the reference system of the transport equipment. For this purpose, acquisition and storage means are provided (not shown) by means of which at least the angular position of the reference mark is detected (for example by a digital camera) and this information is then stored (for example in a computer memory) to make it available later to the geometric measuring unit.

Figure 3:
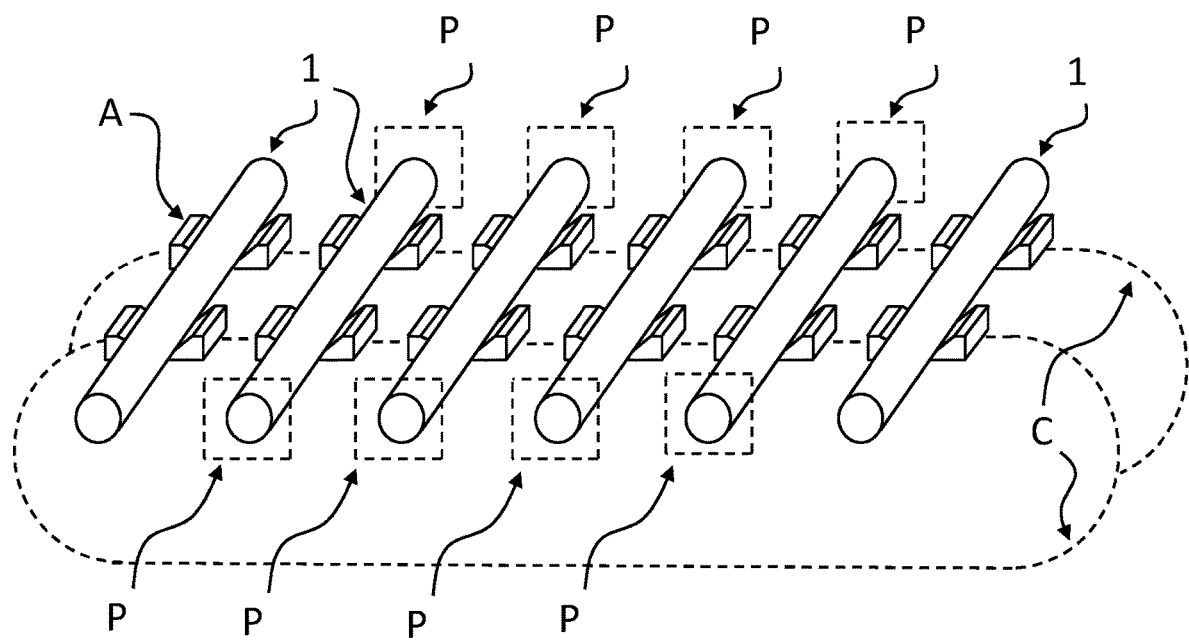
FIG. 3 is a schematic perspective view, illustrating a translation system of prior art.
Figure 4:
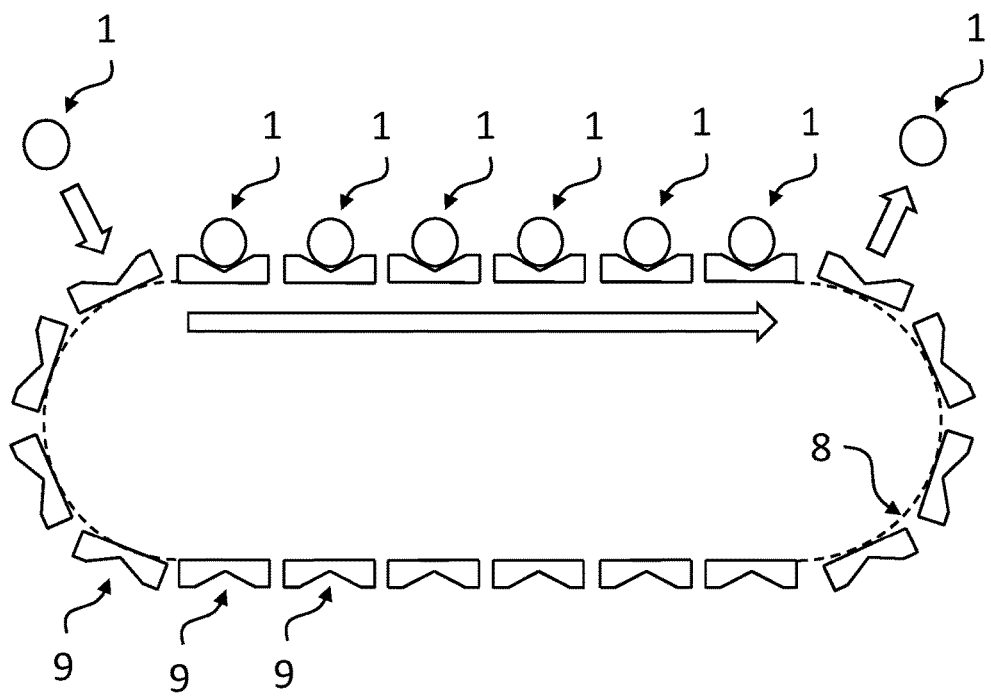
FIG. 4 is a side elevation view of the system of FIG. 3 which illustrates how to load/unload slender bodies.

In FIG. 4 there is schematically shown the transport logic within the equipment of the invention. The transport equipment is, in its base part, substantially similar to that of the prior art described above with reference to FIG. 3.

A loading of the rod 1 is provided on a transport device composed of a series of supports 9 dragged moving by a transmission 8. The slender body or rod is moved with displacements that provide for a stopping or stasis in the positions where machining stations are installed. According to the invention, at each support 9 a gripping and locking device 14 is provided, which is able to fix the angular (phase) and longitudinal position of the slender body or the rod with respect to the relative reference system of the transport device. Further details will be described below with reference to other figures.

The planes P indicated in FIG. 3 are the references for the various machining operations at each step of the process on the slender body 1, due to the fact that the supports are configured originally to prevent rotations and possibly also longitudinal translations.

Note that in the illustrated embodiments a movement path is provided with two linear sections and two curved connecting sections, which implies the use of a flexible chain or belt transmission; in case the movement occur on a circular path, the chain or the belt could be replaced with a rigid structure and the supporting elements would be practically constrained on wheels connected to each other by a shaft transmission.

Figure 5:
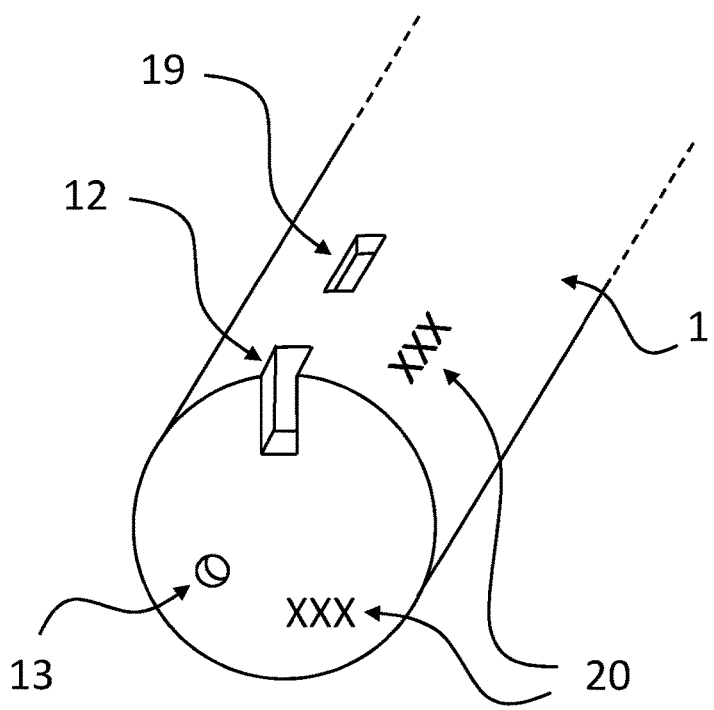
FIG. 5 is a perspective, interrupted view, illustrating various exemplary ways of marking a head end of a circular rod.

In FIG. 5 there are some different reference marks which can be made on the slender body before or immediately after the separation of the single slender body portion (=rod) from the wire in the cutting station 3. The reference marks may be in the form of notches 12, 19 or small holes 13 or stampings performed mechanically, with a laser beam, with chemicals, or printings with visible or luminescent paints or inks when illuminated with suitable sources of electromagnetic waves 20. The choice of the technique with which reference marks are made, obviously has an influence on the detection technique to be employed after locking in the transport equipment.

Figure 6:
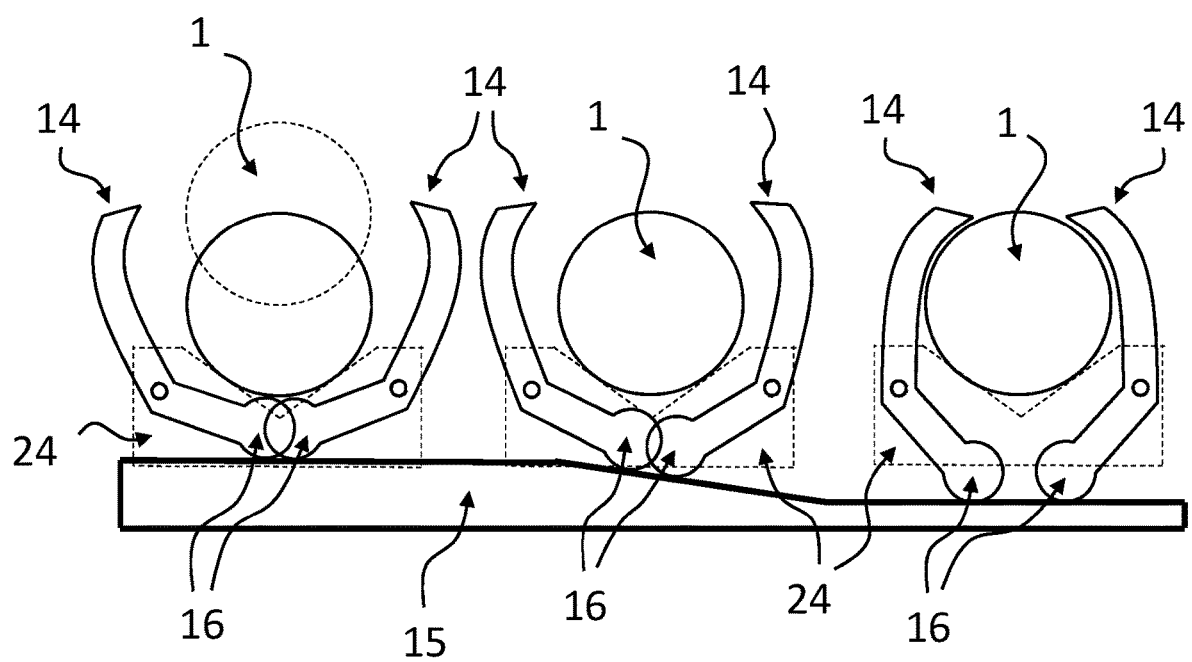
FIG. 6 is a side elevation view of a section of the transport equipment according to a first embodiment of the invention.

The means which guarantee the locking of rotation and longitudinal displacement of the rods during translation movements are constituted by a mobile carriage 24, driven by a drive device 8, possibly flexible but substantially non-extensible, to which one or more mobile grasping 14 devices are connected. The latter ones, as illustrated in FIG. 6, provide control elements 16 intended to interact, for example by sliding or rolling, with stationary parts 15 mounted fixedly on the ground reference external to the transport device, as actuation cams. As the control elements 16 come into contact, in the movement of the transport device, with the stationary parts 15, a closing or opening action of the mobile gripping devices 14 is determined.

It is possible to provide elastic or pneumatic components integral in movement with the moving carriage 24, to suitably oppose the constraints of the fixed control parts and thus obtain a better calibrated and precise operation. Moreover, it is possible to implement driving systems on board the transport device, controlled by the ground fixed system, to allow the opening in desired conditions or positions.

Figure 7A:
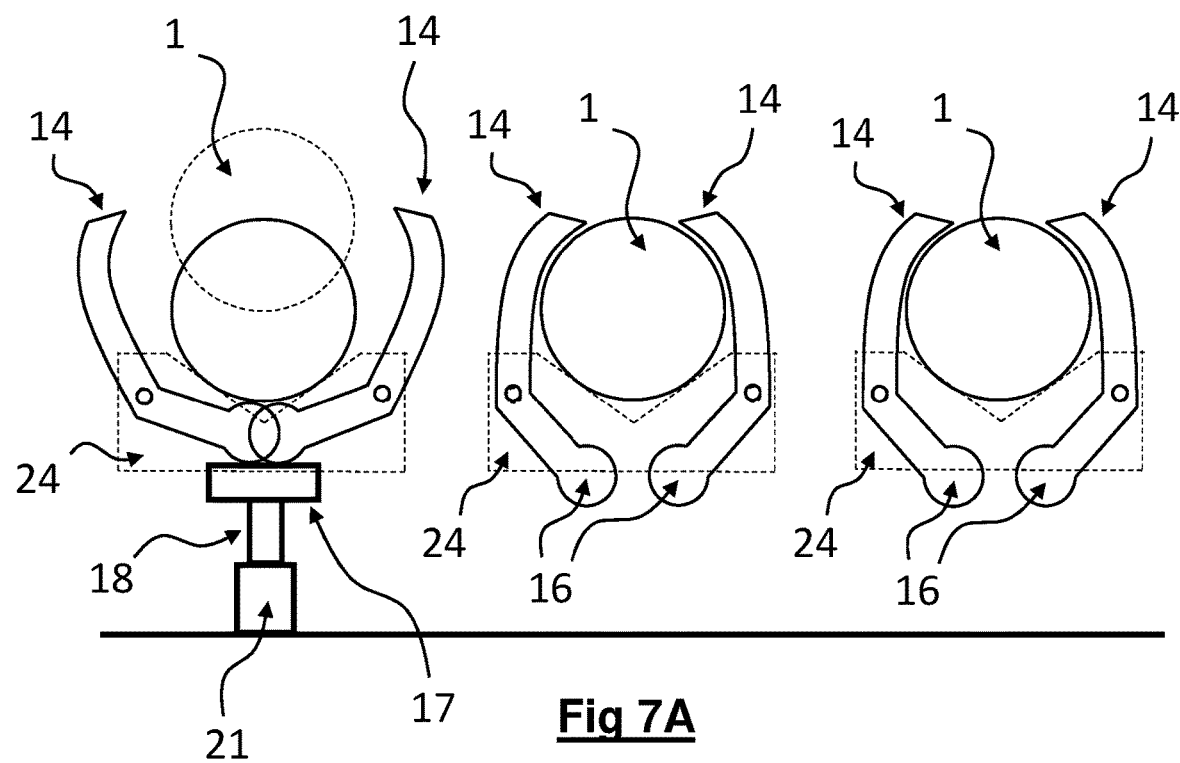
FIGS. 7A and 7B are the same view as FIG. 6 of another embodiment in two different operating steps.
Figure 7B:
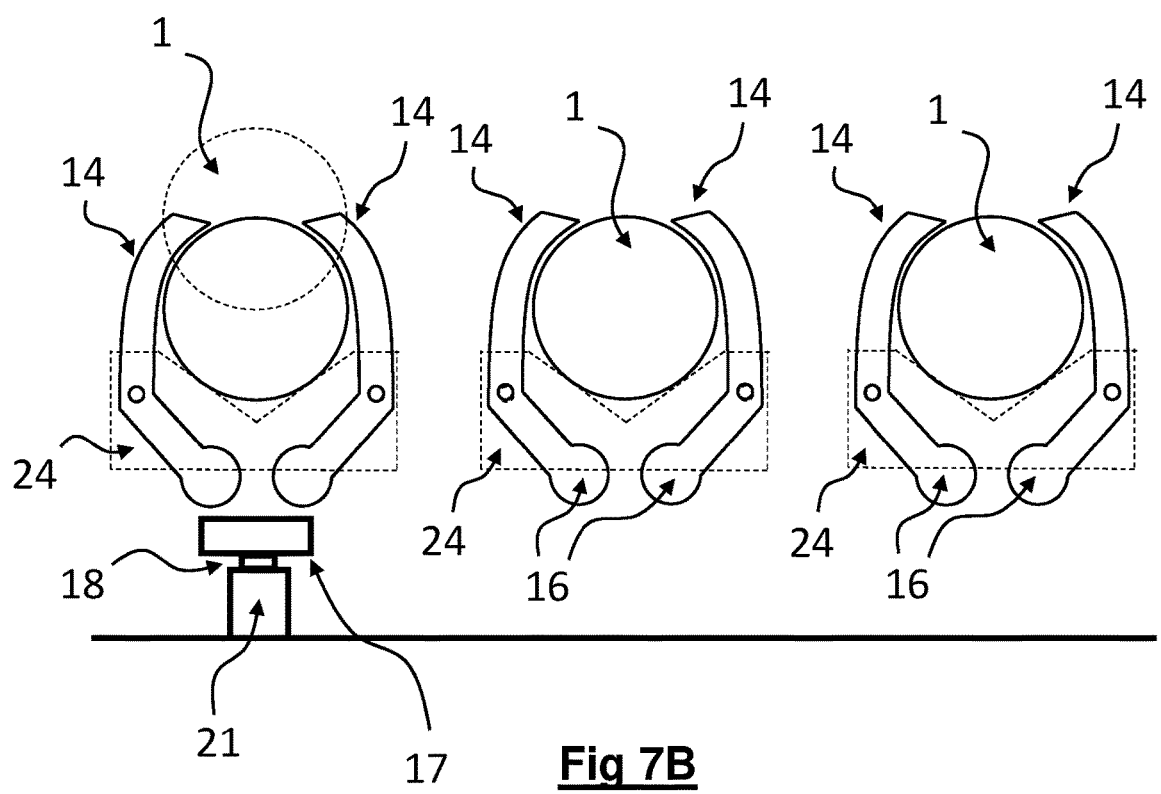

In another embodiment (FIGS. 7A-7B) control devices 21 integral with the fixed ground reference are provided, but provided with active mechanisms for opening or closing the mobile gripping devices 14 in particular positions, in order to allow specific local operations to re-position or displace the rod For example, there is the possibility of holding the rod in the transport system beyond the upper flat part; in this way it is possible to keep the rods above the transport system even in areas where they would otherwise fall due to gravity and thus be able to discharge them at pre-set levels or pre-established positions by exploiting the localized opening action combined with the gravitational fall effect.

Figure 8:
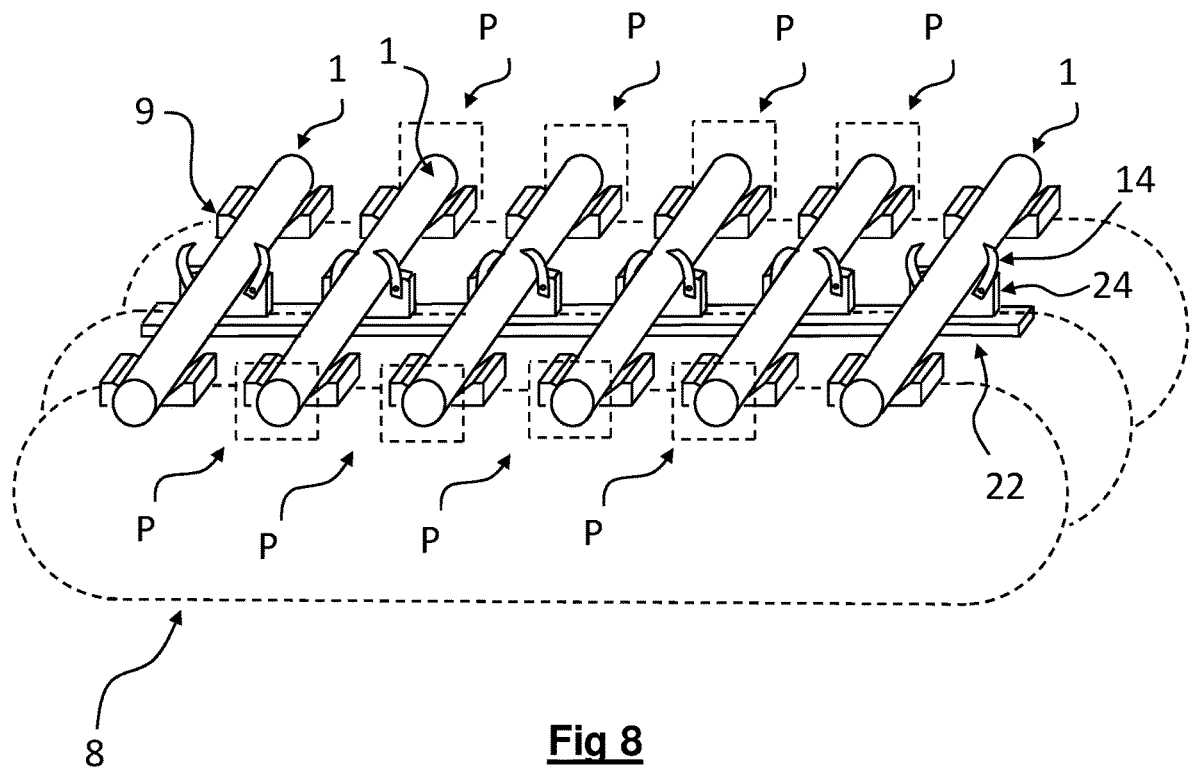
FIG. 8 is a perspective view similar to FIG. 3, of the equipment according to the invention.

FIG. 8 depicts an exemplary embodiment of integration of the transmission chain 8 with mobile gripping assemblies 24. In particular, two transport chains 8 are provided with respective pairs of supports 9 for rods 1, which are equally spaced from one another. The pairs of supports 9, shaped like saddles, are arranged in register on the two chains 8 in order to accommodate the rods 1 transversely to the advancing direction of the chains 8.

Between the two lateral transmission chains 8 a third central transmission chain is provided, on which the gripping assemblies 24 are mounted. In this case, a guide element 22 is also preferably provided, along which the gripping assemblies 24 is moved, arranged in alignment with the supports 9. The guide 22 ensures movement precision of the gripping assembly 24, which the simple transmission chain would not be able to do, so that on the working planes P of the tools there are no irregularly rotated and/or longitudinally displaced rods due to the dynamic stress during transport.

Figure 9:
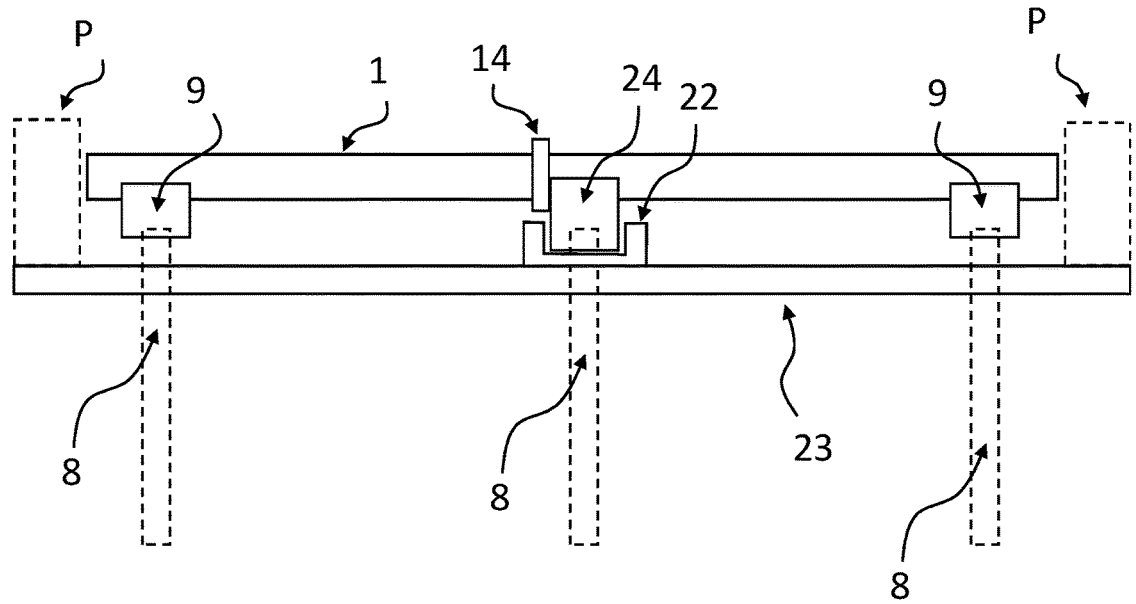
FIG. 9 is a front elevational view of the system of FIG. 8.

FIG. 9 depicts a front elevation view of the equipment identified in the axonometric views of the preceding figures.

The translating gripping assemblies 24 provided with the locking element(s) 14 and arranged in the precision guide 22 which is stabilized with respect to the fixed ground reference are well illustrated. There are also indicated the machining and/or measuring stations P₁ which are placed on the two sides of the transport equipment, the rod 1 which is driven with its ends on the working planes P of the stations P₁ and physical connection means 23 of guide 22 with the support structure of machining and/or measurement stations P₁. These connecting means 23 are particularly useful for guaranteeing the stable position of the movement line of the gripping assemblies 24 with respect to the stations P₁ in case of high machining and/or measurement precision of the ends of the slender artifacts.

As can be understood from the above description, the invention system, providing for the reference marking application at least before the separation of the rod from the continuous wire, and using a transport equipment with gripping and locking devices for the rods, allows to achieve perfectly the purposes set out in the premises. In particular, it is possible to keep the information of the attitude and the phase angle of the rod in the continuous wire, up to the precision check of geometric sizing, which allows to obtain a high machining precision and to intervene with corrective parameters in the upstream production.

It is understood, however, that the invention is not to be considered limited by the particular arrangements illustrated above, which represent only exemplary embodiments, but that different variants are possible, all within the reach of a person skilled in the art, without departing from the scope of protection of the invention itself, as defined by the following claims.

The invention claimed is:

1. Handling system for slender bodies in a production plant of semi-finished products, comprising at least a cutting station (C) apt to separate slender bodies (1) from a continuous wire, a finishing station (E) of the head ends of said slender bodies (1), at least a dimensional verification station (F) downstream of said finishing station (E), and a transporting equipment for transporting said slender bodies (1) between each one of said stations, wherein
at or upstream of said cutting station (C) a marking unit is provided to perform a reference marking on said slender bodies (1), which identifies an original attitude comprising at least an angular position of said slender bodies (1) with respect to a continuous wire from which they were separated,
said transporting equipment comprises gripping and locking assemblies (24) for said slender bodies (1), apt to lock at least the angular position of said reference mark with respect to a relative reference system of said transporting equipment, and wherein
upstream of said finishing station (E) there is provided a detecting and storing data unit for storing data of at least said angular position with respect to said relative reference system, and
means for determining said original attitude of said slender bodies on the basis of said data at least in said dimensional verification station (F) are also provided.

2. The handling system as in claim 1, wherein said transport equipment has at least a pair of parallel conveyor chains (8) on which supports (9) are mounted, apt to accommodate said slender bodies (1) with the longitudinal axis transversal to an advancing direction, said gripping and locking assemblies (24) being located between the pairs of conveyor chains (8).

3. The handling system as in claim 2, wherein said gripping and locking assemblies (24) is arranged on a transport chain aligned with corresponding pairs of supports (9) and engaged in sliding guides (22).

4. The handling system as in claim 3, wherein said gripping and locking assemblies (24) is actuated by control means (15, 17, 18, 21) which are stationary with respect to a fixed ground reference system and act upon passage.

5. The handling system as in claim 1, wherein said gripping and locking assemblies (24) is actuated by control means (15, 17, 18, 21) which are stationary with respect to a fixed ground reference system and act upon passage.

6. The handling system as in claim 2, wherein said gripping and locking assemblies (24) is actuated by control means (15, 17, 18, 21) which are stationary with respect to a fixed ground reference system and act upon passage.

7. Handling system of slender bodies in a production plant, comprising at least a cutting station (C) apt to separate slender bodies (1) from a continuous wire and a finishing station (E) of the head ends of said slender bodies (1), between said stations being provided a transport equipment for said slender bodies (1), wherein
said transport equipment comprises gripping and locking assemblies (24) for said slender bodies (1), apt to lock said slender bodies (1) with respect to a relative reference system of said transport equipment, and wherein
data storing means are also provided for storing data relating to an original attitude of said slender bodies comprising at least one angular position with respect to a continuous wire from which they have been separated,
and a dimensional verification station (F) is provided, downstream of said finishing station (E), which performs measurements using said original attitude data.

8. The handling system as in claim 7, wherein said transport equipment has at least a pair of parallel conveyor chains (8) on which supports (9) are mounted, apt to accommodate said slender bodies (1) with the longitudinal axis transversal to an advancing direction, said gripping and locking assemblies (24) being located between the pairs of conveyor chains (8).

9. The handling system as in claim 8, wherein said gripping and locking assemblies (24) is actuated by control means (15, 17, 18, 21) which are stationary with respect to a fixed ground reference system and act upon passage.

10. The handling system as in claim 7, wherein said gripping and locking assemblies (24) is actuated by control means (15, 17, 18, 21) which are stationary with respect to a fixed ground reference system and act upon passage.

11. Method of handling slender bodies in the production of semi-finished products, comprising providing the handling system as in claim 1, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

12. Method of handling slender bodies in the production of semi-finished products, comprising initially separating a slender body (1) from a continuous wire and, after performing mechanical machining, finally carrying out a dimensional precision measurement, characterized in that it comprises at least the steps of:

applying a reference marking on said slender body (1), which identifies an original position of the slender body comprising at least an angular position with respect to the respective continuous wire, before carrying out said separation operation, grasping and locking said slender body (1) on a relative reference system of a transport equipment, locking at least said angular position of said reference mark, detecting and storing at least said angular position with respect to the relative reference system, in order to be able to reconstruct said original position of said slender body at least during said dimensional precision measurement, and removing said reference mark.

13. Method of handling slender bodies in the production of semi-finished products, comprising providing the handling system as in claim 7, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

14. Method of handling slender bodies in the production of semi-finished products, comprising providing the handling system as in claim 2, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

15. Method of handling slender bodies in the production of semi-finished products, comprising providing the handling system as in claim 3, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

16. Method of handling slender bodies in the production of semi-finished products, comprising providing the handling system as in claim 5, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

17. Method of handling slender bodies in the production of semi-finished products, comprising providing the handling system as in claim 8, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

18. Method of handling slender bodies in the production of semi-finished products, comprising providing the handling system as in claim 10, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

19. Method of handling slender bodies in the production of semi-finished products, comprising providing the handling system as in claim 10, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

20. Method of handling slender bodies in the production of semi-finished products, comprising providing the handling system as in claim 4, and using the handling system to perform the following steps at or upstream of a cutting station (C), prior to separating a slender body (1) from a respective continuous wire, apply a reference marking on said slender bodies (1), which identifies an original position of the slender body comprising at least an angular position with respect to the continuous wire, transferring said slender bodies (1) along a machining process up to a dimensional verification station (F) by means of a transporting equipment, on which said slender bodies are gripped, locking at least said angular position identified by said reference mark with respect to the relative reference system of said transport equipment, and before a finishing station (E), wherein said reference marking is eliminated, detecting and storing at least said angular position with respect to said relative reference system, in order to be able to reconstruct said original position of said slender bodies at least in a dimensional verification station (F) downstream of the finishing station (E).

* * * * *